United States Patent
Kim et al.

(10) Patent No.: US 12,105,300 B2
(45) Date of Patent: Oct. 1, 2024

(54) IMAGE SHAKING-PREVENTION DEVICE INCLUDING PRISM, AND CAMERA MODULE COMPRISING SAME

(71) Applicant: LG INNOTEK CO., LTD., Seoul (KR)

(72) Inventors: Kyung Won Kim, Seoul (KR); Soo Min Jeong, Seoul (KR); Ji Sung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 813 days.

(21) Appl. No.: 17/268,888

(22) PCT Filed: Aug. 14, 2019

(86) PCT No.: PCT/KR2019/010396
§ 371 (c)(1),
(2) Date: Feb. 16, 2021

(87) PCT Pub. No.: WO2020/036449
PCT Pub. Date: Feb. 20, 2020

(65) Prior Publication Data
US 2022/0121036 A1   Apr. 21, 2022

(30) Foreign Application Priority Data
Aug. 16, 2018 (KR) .................. 10-2018-0095489

(51) Int. Cl.
G02B 27/64 (2006.01)
G02B 5/06 (2006.01)
(Continued)

(52) U.S. Cl.
CPC ............ *G02B 27/646* (2013.01); *G02B 5/06* (2013.01); *G02B 26/004* (2013.01);
(Continued)

(58) Field of Classification Search
CPC ...... H04N 23/686; H04N 23/55; H04N 23/68; H04N 23/682; H04N 23/685; G02B 5/06;
(Continued)

(56) References Cited

U.S. PATENT DOCUMENTS 3,514,192 A * 5/1970 De La Cierva ...... G02B 27/646
359/557
7,965,931 B2 6/2011 Cho et al.
(Continued)

FOREIGN PATENT DOCUMENTS

KR   10-2007-0061390 A   6/2007
KR   10-2007-0096540 A   10/2007
(Continued)

OTHER PUBLICATIONS

International Search Report dated Nov. 25, 2019 in International Application No. PCT/KR2019/010396.
(Continued)

*Primary Examiner* — Stephone B Allen
*Assistant Examiner* — Adam W Booher
(74) *Attorney, Agent, or Firm* — Saliwanchik, Lloyd & Eisenschenk

(57) ABSTRACT

The embodiment relates to an image stabilization device and a camera module including the same.

The image stabilization device according to the embodiment includes: a first prism for changing a path of a light beam; a second prism disposed below the first prism and changing a path of light beam emitted from the first prism; an image stabilization control unit for controlling a shape of the second prism including a coil part and a magnet part.

The first prism may be disposed inside the image stabilization control unit. The second prism may be a variable wedge prism. The image stabilization control unit may control the path of the light beam by changing the shape of the second prism through the magnet part.

15 Claims, 10 Drawing Sheets

(51) Int. Cl.
    *G02B 26/00*      (2006.01)
    *G02B 26/08*      (2006.01)
    *G03B 5/00*      (2021.01)
    *H01F 7/08*      (2006.01)
    *H04N 23/55*      (2023.01)
    *H04N 23/68*      (2023.01)

(52) U.S. Cl.
CPC ........... *G02B 26/0883* (2013.01); *G03B 5/00* (2013.01); *H01F 7/081* (2013.01); *H04N 23/55* (2023.01); *H04N 23/686* (2023.01); *G03B 2205/003* (2013.01); *G03B 2205/0069* (2013.01)

(58) Field of Classification Search
CPC ................ G02B 26/004; G02B 27/646; G02B 26/0883; G02B 26/0891; G03B 2205/003; G03B 5/00; G03B 2205/0069; G03B 2205/0007; H01F 7/081
See application file for complete search history.

(56) References Cited

U.S. PATENT DOCUMENTS

| | | | |
|---|---|---|---|
| 9,927,600 | B2 | 3/2018 | Goldenberg et al. |
| 2007/0133092 | A1 | 6/2007 | Maeda et al. |
| 2007/0279765 | A1 | 12/2007 | Takahashi |
| 2016/0259094 | A1* | 9/2016 | Aschwanden ....... G02B 27/095 |
| 2019/0104239 | A1 | 4/2019 | Aschwanden et al. |

FOREIGN PATENT DOCUMENTS

| | | |
|---|---|---|
| KR | 10-2007-0115627 A | 12/2007 |
| KR | 10-2011-0016359 A | 2/2011 |
| KR | 10-1506479 B1 | 3/2015 |
| KR | 10-1661325 B1 | 9/2016 |
| KR | 10-2018-0031070 A | 3/2018 |
| WO | WO-2017/149092 A2 | 9/2017 |

OTHER PUBLICATIONS

Office Action dated Aug. 22, 2022 in Korean Application No. 10-2018-0095489.

* cited by examiner

IMAGE SHAKING-PREVENTION DEVICE INCLUDING PRISM, AND CAMERA MODULE COMPRISING SAME

CROSS-REFERENCE TO RELATED APPLICATIONS

This application is the U.S. national stage application of International Patent Application No. PCT/KR2019/010396, filed Aug. 14, 2019, which claims the benefit under 35 U.S.C. § 119 of Korean Application No. 10-2018-0095489, filed Aug. 16, 2018, the disclosures of each of which are incorporated herein by reference in their entirety.

TECHNICAL FIELD

The embodiment relates to an image stabilizing device and a camera module including the same.

BACKGROUND ART

The camera module performs a function of photographing a subject and storing it as an image or video, and is mounted on a mobile terminal such as a mobile phone, a laptop, a drone, or a vehicle.

On the other hand, portable devices such as smartphones, tablet PCs, and laptops have a built-in micro camera module, which can perform a autofocus function (AF) automatically adjusting the distance between the image sensor and the lens to align the focal length of the lens.

In addition, the recent camera module may perform a zooming function of zooming up or zooming out by increasing or decreasing the magnification of a distant subject through a zoom lens.

In addition, recently, the camera module uses an image stabilization (IS) technology, and a technique for correcting or inhibiting image un-stabilization due to camera movement due to an unstable fixing device or user movement is adopted.

The image stabilization (IS) technology includes optical image stabilizer (OIS) technology and image stabilization technology using an image sensor.

OIS technology is a technology that corrects motion by changing the path of light, and image stabilization technology using the image sensor is a technology that corrects motion in a mechanical and electronic way, and the OIS technology is more used.

On the other hand, the image sensor has a higher resolution as it goes to a higher pixel, so that the size of the pixel decreases. However, as the pixel becomes smaller, the amount of light received at the same time decreases. Therefore, in a dark environment, the higher the pixel camera, the more severe the blurring of the image due to hand shake appears as the shutter speed decreases.

Accordingly, in order to capture an image without distortion using a high-pixel camera in a dark night or especially in a video, the OIS function has recently been essentially adopted.

On the other hand, OIS technology is a method of correcting image quality by correcting the optical path by moving the camera's lens or image sensor. In particular, OIS technology detects the movement of the camera through a gyro sensor and a distance of the lens or the image sensor to move is calculated.

For example, the OIS correction method includes a lens movement method and a module tilting method. The lens movement method moves only the lens in the camera module to rearrange the center and optical axis of the image sensor. On the other hand, the module tilting method is a method of moving the entire module including the lens and the image sensor.

In particular, the module tilting method has a wider correction range than the lens shifting method, and the focal length between the lens and the image sensor is fixed, thereby minimizing image distortion.

Meanwhile, in the case of the lens movement method, a Hall sensor is used to detect the position and movement of the lens. On the other hand, in the module tilting method, a photo reflector is used to detect the movement of the module. However, both methods use a gyro sensor to detect the movement of the camera user.

The OIS controller uses data recognized by the gyro sensor to predict where the lens or module should move to compensate for the user's movement.

On the other hand, the OIS technology of the related art requires a mechanical driving device for lens movement or tilting of the module, so the structure is complicated, and a driving element or a gyro sensor must be installed, and thus there is a limit to realizing a compact camera module.

In addition, in the conventional OIS technology, there is a problem in that it is difficult to secure the amount of light by limiting the length of the lens.

In particular, in the conventional OIS technology, there is a problem that it is difficult to drive by causing magnetic field interference in proximity to the magnet for OIS and the magnet for AF.

DISCLOSURE

Technical Problem

One of the technical problems of the embodiment is to provide an image stabilization device and a camera module including the same, capable of inhibiting magnetic field interference between an OIS magnet and an AF magnet.

The technical problems of the embodiments are not limited to those described in this section, and include what can be understood from the entire description of the invention.

Technical Solution

An image stabilization device according to an embodiment includes: a first prism 71a for changing a path of light beams; a second prism 71b disposed under the first prism 71a and changing a path of light emitted from the first prism 71a; an image stabilization control unit 72 including a coil part 72C and a magnet part 72M for controlling a shape of the second prism 71b.

The first prism 71a may be disposed inside the image stabilization control unit 72.

The second prism 71b may be a variable wedge prism.

The image stabilization control unit 72 may control the path of the light beam by changing the shape of the second prism 71b through the magnet part 72M.

A path of the light beam may be controlled by changing the apex angle of the second prism 71b through the magnet part 72M.

The second prism 71b may include a first support 71b1, a second support 71b2, and a side support 71bs.

The embodiment may include an optical liquid 71b3 disposed in a space made by the first support 71b1, the second support 71b2, and the side support 71bs.

The first support 71b1 and the second support 71b2 may be formed of a translucent material.

The side support 71bs may be formed of an elastic material.

The second support 71b2 may be changed in contact with the magnet part.

The second support 71b2 may be changed while being spaced apart from the magnet part.

A camera module according to an embodiment includes a first base and a lens assembly disposed on the first base; an image sensor unit disposed on one side of the lens assembly; and the image stabilization device disposed on the other side of the lens assembly.

Advantageous Effects

According to an embodiment, there is a technical effect of providing an image stabilization device and a camera module including the same, capable of inhibiting magnetic field interference between the OIS magnet and the AF magnet.

The technical effects of the embodiments are not limited to what is described in this section, and include what can be understood from the entire description of the invention.

MODE FOR INVENTION

Figure 1:
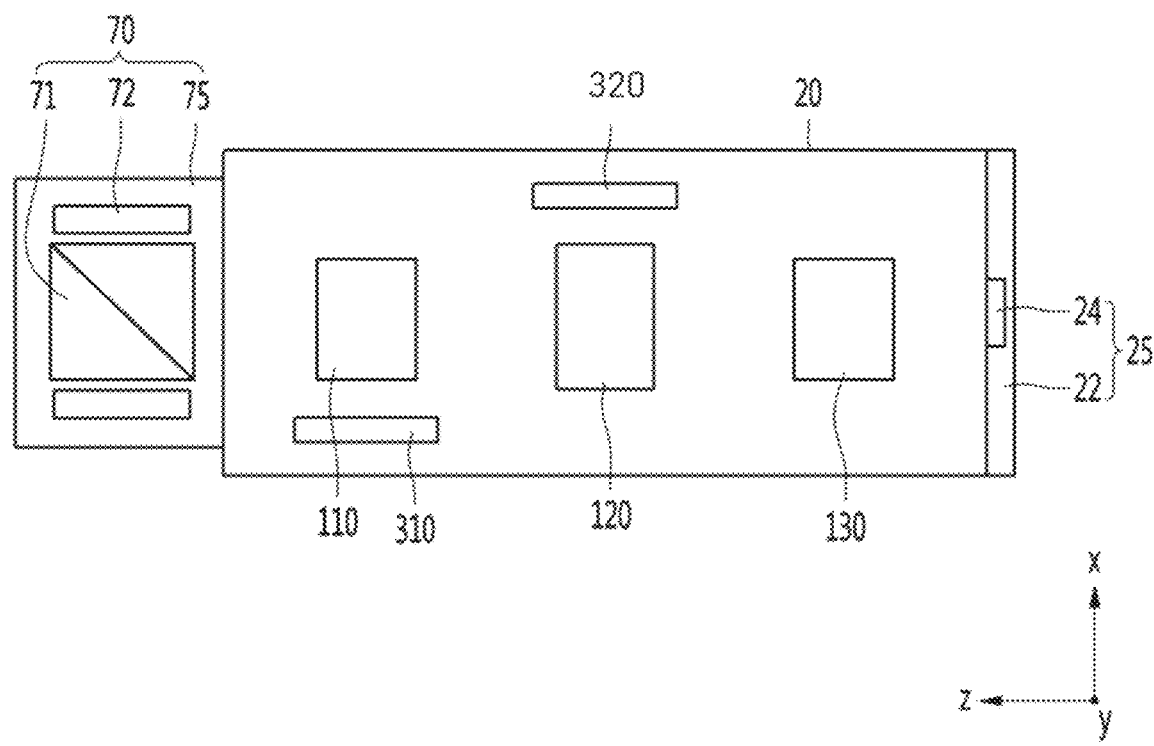
FIG. 1 is a conceptual diagram of a camera module according to an embodiment.

Hereinafter, embodiments will be described in detail with reference to the accompanying drawings. Since the embodiments can be modified in various ways and have various forms, specific embodiments will be illustrated in the drawings and described in detail in the text. However, this is not intended to limit the embodiments to a specific type of disclosure, and it should be understood that all changes, equivalents, and substitutes are included in the spirit and scope of the embodiments.

Terms such as "first" and "second" may be used to describe various elements, but the elements should not be limited by the terms. These terms are used for the purpose of distinguishing one component from another component. In addition, terms specifically defined in consideration of the configuration and operation of the embodiment are only for describing the embodiment, and do not limit the scope of the embodiment.

In the description of the embodiment, in the case of being described as being formed on "upper (top)" or "lower (under)" of each element, the upper (top) or lower (under) includes both elements in direct contact with each other or in which one or more other elements indirectly formed between the two elements. In addition, when expressed as "up (top)" or "on or under", the meaning of not only an upward direction but also a downward direction based on one element may be included.

In addition, relational terms such as "top/upper/above" and "bottom/lower/below" used below do not necessarily require or imply any physical or logical relationship or order between such entities or elements, it may be used to distinguish one entity or element from another entity or element.

(Embodiment)

Figure 2:
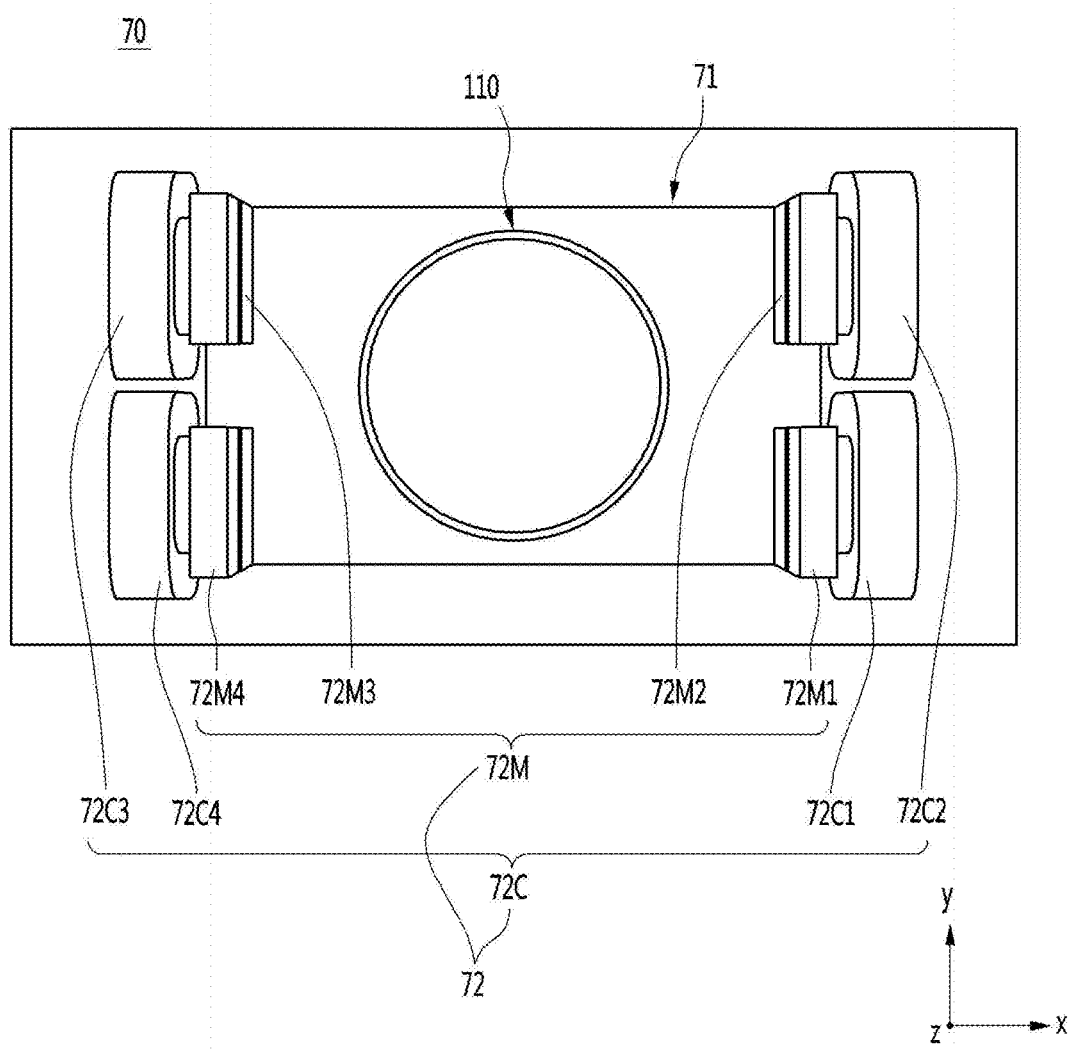
FIG. 2 is a side view of the image stabilization device of the embodiment.

FIG. 1 is a conceptual diagram of a camera module 100 according to an embodiment, and FIG. 2 is a side view of the optical image stabilization device 70 which is a side view in the direction of z-axis of the camera module 100 according to the embodiment shown in FIG. 1.

In the xyz axis direction shown in FIGS. 1 to 2, the xz plane represents the ground, the z axis means the optical axis direction or a parallel direction thereof, and the x axis is the direction perpendicular to the z axis in the ground (xz plane) and the y-axis may mean a direction perpendicular to the ground.

The camera module 100 according to the embodiment may include a single or a plurality of lens assemblies disposed on the first base 20.

At this time, in the description of the embodiment, it is described as a case where there are two moving lens groups, but the present invention is not limited thereto, and the moving lens group may be three, four, or five or more.

For example, referring to FIG. 1, in an embodiment, the first lens assembly 110 and the second lens assembly 120 may be moving lens groups, and the third lens assembly 130a fixed lens group. In addition, the optical axis direction z may mean a direction that is the same as or parallel to the direction in which the lens groups are aligned. At this time, the third lens assembly 130, which is a fixed lens group, may be disposed in front, unlike the illustration of FIG. 1.

Accordingly, referring to FIG. 1, the camera module 100 according to the embodiment includes a first lens assembly 110, a second lens assembly 120, and a third lens assembly 130, and thereby can conduct a zooming function and an autofocus (AF) function.

Also, referring to FIGS. 1 and 2, the camera module 100 according to the embodiment includes various optical systems such as a first lens assembly 110, a second lens assembly 120, and a third lens assembly 130 on a predetermined first base 20. An optical image stabilization device 70 can be disposed on one side of the first base 20, for example, on one side of the first base 20 in the direction of the first lens assembly 110, and a predetermined image sensor unit 25 may be disposed on the other side of the first base 20, for example, in the direction of the third lens assembly 130.

The optical image stabilization device 70 may include a prism 71 disposed on the second base 75 and an image stabilization control unit 72 disposed on one side of the prism 71.

The prism 71 may change the path of light in the direction of the lens center of the first lens assembly 110 through the path of the predetermined light beam. For example, referring to FIGS. 4A and 4B, the prism 71 includes a first prism 71a changing the first path of the light beam L1 to the second path L1a, and a second prism 71b that is disposed below the first prism 71a and changes the path of the light beam emitted from the first prism 71a to the third path L1b.

Figure 4A:
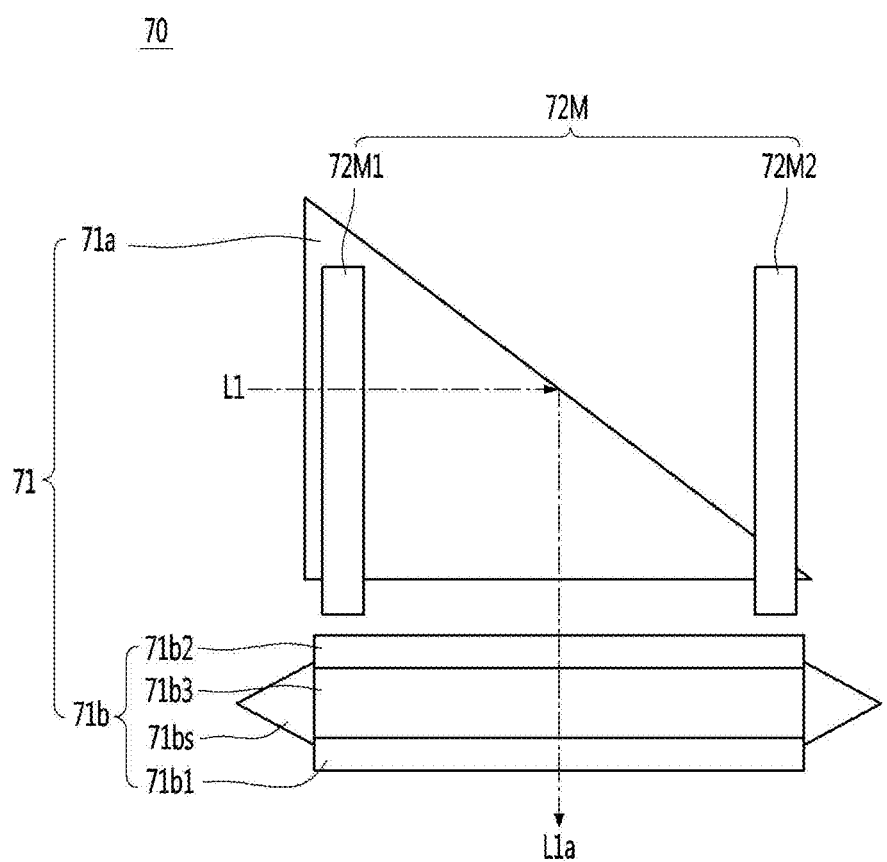
FIGS. 4A to 4B are exemplary views of the operation of the image stabilization device of the embodiment.
Figure 4B:
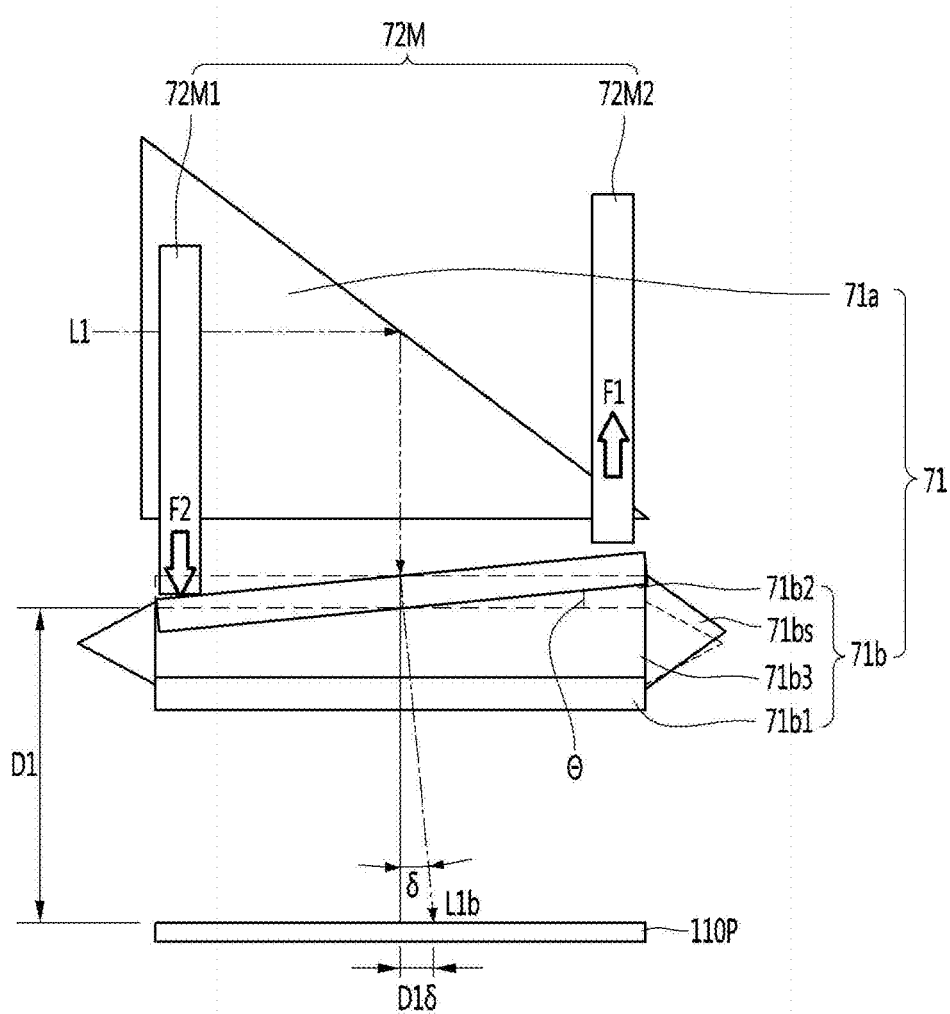

Referring to FIG. 4A, the second prism 71b does not change the second movement path L1a of the light changed by the first prism 71a. However, FIG. 4B shows a state in which the second movement path of light changed by the first prism 71*a* is changed to the third movement path L1*b*.

The characteristics of the prism 71 of the embodiment will be described later.

Referring back to FIG. 1, in an embodiment, the image sensor unit 25 may include an image sensor 24 disposed on a predetermined circuit board 22. For example, in an embodiment, the image sensor unit 25 may be arranged perpendicular to the optical axis direction of light. The image sensor unit 25 may include a solid-state imaging device disposed on a predetermined circuit board 22. For example, the image sensor unit 25 may include a CCD (Charge Coupled Device) image sensor or a Complementary Metal-Oxide-Semiconductor (CMOS) image sensor 24, but it is not limited thereto.

Figure 3:
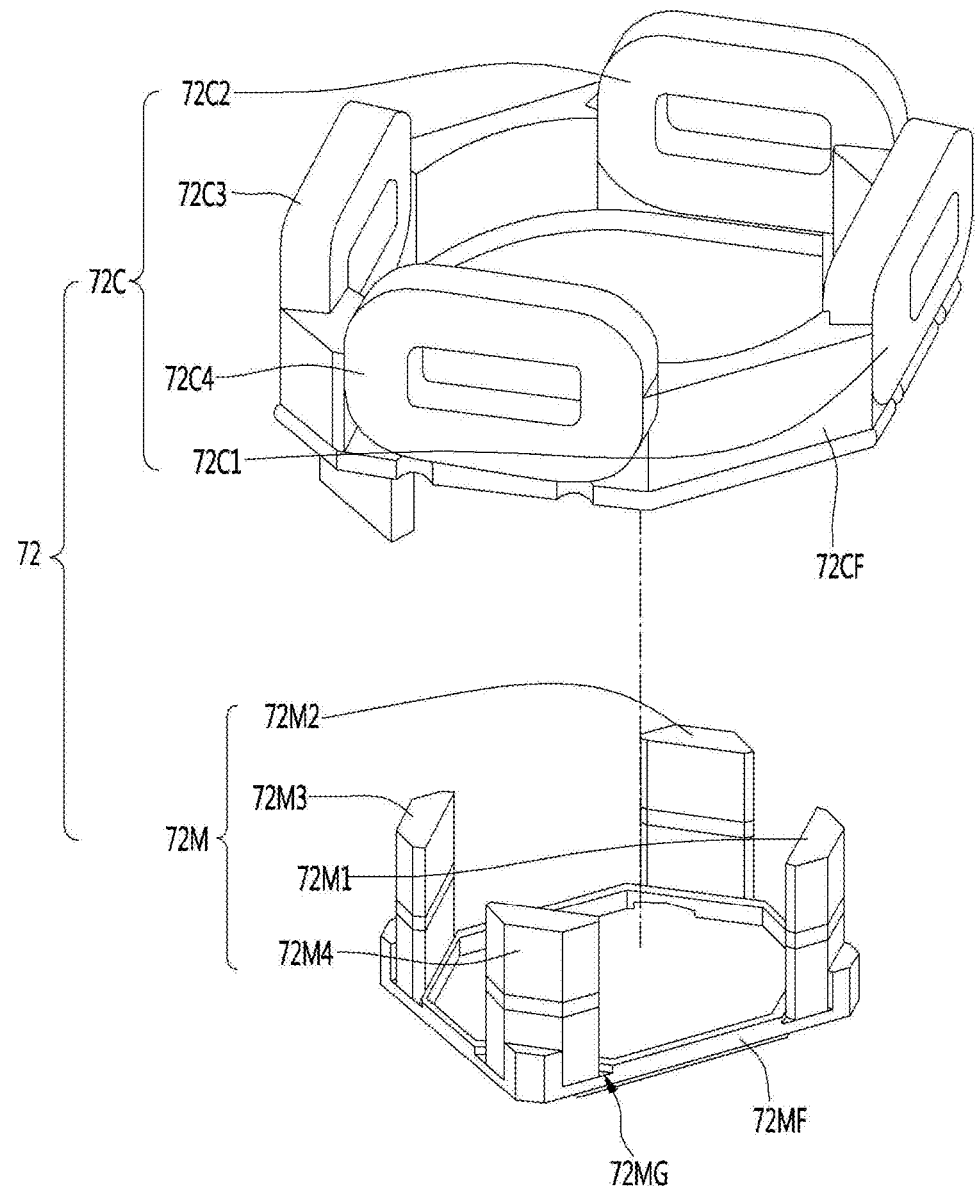
FIG. 3 is an exploded perspective view of the image stabilization control unit of the image stabilization device of the embodiment.

Next, FIG. 2 is a side view of the camera module 100 according to the embodiment shown in FIG. 1 in the z-axis direction, and FIG. 3 is an exploded perspective view of the image stabilization control unit 72 in the optical image stabilization device 70 of the embodiment.

FIGS. 4A to 4B are exemplary views of the operation of the optical image stabilization device 70 according to the embodiment.

Referring to FIG. 2, the optical image stabilization device 70 according to the embodiment may include an image stabilization control unit 72 disposed on one side of a predetermined prism 71. In FIG. 2, the first lens assembly 110 disposed in a direction perpendicular to the optical axis (z-axis) is illustrated, but the optical image stabilization device 70 according to the embodiment does not include the first lens assembly 110 as a component.

In an embodiment, the image stabilization control unit 72 may include a coil part 72C and a magnet part 72M, and the magnet part 72M is disposed between the prism 71 and the coil part 72C.

As described above, referring to FIGS. 4A and 4B, in an embodiment, the prism 71 includes the first prism 71*a* and changes the light travel path of the predetermined light beam L1. It may include a second prism 71*b* disposed below the first prism 71*a* that changes a movement path of light emitted from the first prism 71*a*.

Referring back to FIG. 2, the optical image stabilization device 70 of the embodiment may include an image stabilization control unit 72 disposed on at least one side of the first prism 71*a*, and the image stabilization control unit may include a coil part 72C, a magnet part 72M and can control a shape of the second prism 71*b*.

For example, the coil part 72C may include a plurality of coils. For example, the coil part 72C may include a first coil 72C1, a second coil 72C2, a third coil 72C3, and a fourth coil 72C4, but it is not limited thereto.

In addition, the magnet part 72M may include a plurality of magnets. For example, the magnet part 72M includes a first magnet 72M1, a second magnet 72M2, a third magnet 72M3 and a fourth magnet 72M4 corresponding to the first coil 72C1 to the fourth coil 72C4, but is not limited thereto.

Next, FIG. 3 is an exploded perspective view of the image stabilization control unit 72 in the optical image stabilization device 70 according to the embodiment.

The optical image stabilization device 70 of the embodiment includes a coil part 72C and a magnet part 72M. The coil part 72C may include a plurality of coils and the magnet part 72M may include a plurality of magnets correspond to their coils, respectively.

For example, in the embodiment, the magnet part 72 includes a magnet holder 72MF and a plurality of magnets 72M, and the plurality of magnets 72M are spaced apart at predetermined intervals on the magnet holder 72MF. For example, the magnet holder 72MF may be a hollow circular ring shape or a rectangular ring shape, and a plurality of magnet guides 72MG for receiving a plurality of magnets 72M may be formed. Here, the magnet holder 72MF may include a magnetic material or a soft magnetic material, and may include Fe, for example.

Next, the coil part 72C may include a coil holder 72CF, a plurality of coils, and a coil terminal (not shown). The plurality of coils may include a first coil 72C1, a second coil 72C2, a third coil 72C3 and a fourth coil 72C4 which may be arranged spaced apart at a predetermined interval to pair with a plurality of magnets 72M on the coil holder 72CF.

For example, the coil holder 72CF may have a hollow circular ring shape or a rectangular ring shape, and a plurality of coil guides for accommodating a plurality of coils may be formed. The coil terminal is connected to a plurality of coils, and power can be applied to the plurality of coils.

Next, FIGS. 4A to 4B are exemplary views of the operation of the optical image stabilization device of the embodiment.

For example, FIG. 4A is an exemplary view before operation of the optical image stabilization device of the embodiment, and FIG. 4B is an exemplary view after operation of the optical image stabilization device of the embodiment.

In an embodiment, the prism 71 may include a first prism 71*a* that changes the path of the predetermined light beam and a second prism 71*b* disposed under the first prism 71*a* which change the path of the light beam emitted from the first prism 71*a*.

In an embodiment, the first prism 71*a* may be a right-angle prism, and may be disposed inside the image stabilization control unit 72. In addition, in the embodiment, the second prism 71*b* may be a variable wedge prism.

According to an embodiment, as the first prism 71*a* is disposed inside the image stabilization control unit 72, the magnet part 72M, which is a magnet for OIS, may be disposed apart from the driving unit for AF.

That is, referring to FIG. 1, when the first lens assembly 110 or the second lens assembly 120 is utilized for AF, a predetermined magnet is provided in the first lens assembly 110 or the second lens assembly 120.

At this time, according to the embodiment, the magnet part 72M of the image stabilization control unit 72, which is a magnet for OIS, is disposed separately from the first lens assembly 110 or the second lens assembly 120, and the first prism 71*a* is disposed inside the image stabilization control unit 72, so there is a special technical effect of providing an image stabilization device and a camera module including the same capable of inhibiting magnetic field interference between the OIS magnet and the AF magnet.

The optical image stabilization control unit 72 of the embodiment may control the optical movement path by changing the shape of the second prism 71*b* through the coil part 72C and the magnet part 72M.

For example, in an embodiment, the optical image stabilization control unit 72 may control the path of the light beam by changing the apex angle Θ of the second prism 71*b* through the magnet part 72M.

For example, in FIG. 4A, the second prism 71*b* does not change the second movement path L1*a* of the light beam changed by the first prism 71*a*. While FIG. 4B shows a state in which the second moving path is changed to the third moving path L1*b*.

Referring to FIGS. 4A and 4B, in the embodiment, the second prism 71b includes a first support 71b1, a second support 71b2, and a side support 71bs. And an optical liquid 71b3 can be disposed in a space formed by the first support 71b1, the second support 71b2 and the side support 71bs.

For example, the second prism 71b may include a first support 71b1 disposed on the lower portion and a second support 71b2 disposed on the upper portion, and a side support 71bs disposed on the side of the first support 71b1 and the second support 71b2.

The first support 71b1 and the second support 71b2 may be formed of a translucent material. For example, the first support 71b1 and the second support 71b2 may be formed of glass, but is not limited thereto.

The first support 71b1 and the second support 71b2 may have a hollow circular ring shape or a rectangular ring shape.

The side support 71bs may be formed of an elastic material. For example, the side support 71bs may be made of an elastic film and, as shown in FIG. 4B, when receiving a predetermined force by the magnet part 72M, a portion of the second support 71b2 moves upward or downward. Due to the nature of the flexible elastic material of the side support 71bs, the shape of the second prism 71b is variable.

For example, the side support 71bs may be a reverse osmosis (RO) membrane, a nano filtration (NF) membrane, an ultra-filtration (UF) membrane, or a micro filtration (MF) membrane, but is not limited thereto. Here, the RO membrane is a membrane having a pore size of about 1 to 15 Å, the NF membrane is a membrane having a pore size of about 10 Å, and the UF membrane is a membrane having a pore size of about 15 to 200 Å, the MF membrane may be a membrane having a pore size of about 200 to 1000 Å.

In the embodiment, the optical liquid 71b3 is transparent, and has low fluorescence, and may adopt a non-toxic material. For example, the optical liquid 71b3 of the embodiment may employ a chlorofluorocarbon (CFC) component or the like, but is not limited thereto.

In the embodiment, as shown in FIG. 4B, the second support 71b2 may move in contact with a plurality of magnets 72M or spaced apart from the plurality of magnet guides 72M.

For example, in the case of FIG. 4B, the second support 71b2 is in contact with the magnet part 72M to show a variable state.

For example, the upper left side of the second support 71b2 receives the force F2 in the second direction from the first magnet 72M1. At this time, the upper right of the second support 71b2 may be varied by receiving the force F1 in the first direction from the second magnet 72M2, and the second support 71b2 may be changed at a slope of a predetermined angle Θ.

Further, in the embodiment, when the second support 71b2 includes a magnetic material or a soft magnetic material, the magnet part 72M may be spaced apart and moved to be variable.

Hereinafter, with reference to FIG. 4B, the image stabilization device for controlling the path of the light beam by modifying the shape of the second prism 71b through the magnet part 72M will be described in more detail.

First, according to the embodiment, the image may need to be moved to the side of the first lens assembly on the image plane 110P by a first distance D16 as the camera shake occurs.

At this time, D1 is the distance from the second prism 71b to the image plane 110P of the first lens assembly, δ is the chromatic aberration of the second prism 71b, and Θ is the apex angle of the second prism 71b.

That is, according to the embodiment, after calculating the apex angle Θ to be shifted of the second prism 71b, the apex angle Θ of the second prism 71b is changed through the magnet part 72M to route the light beam to be controlled by the third path L1b.

At this time, between the chromatic aberration δ of the second prism 71b and the apex angle Θ of the second prism 71b, a relationship of $\delta=(n-1)\times\Theta$ can be established (where n is a refractive index of the second prism 71b with respect to the central wavelength of the band of interest).

Figure 5:
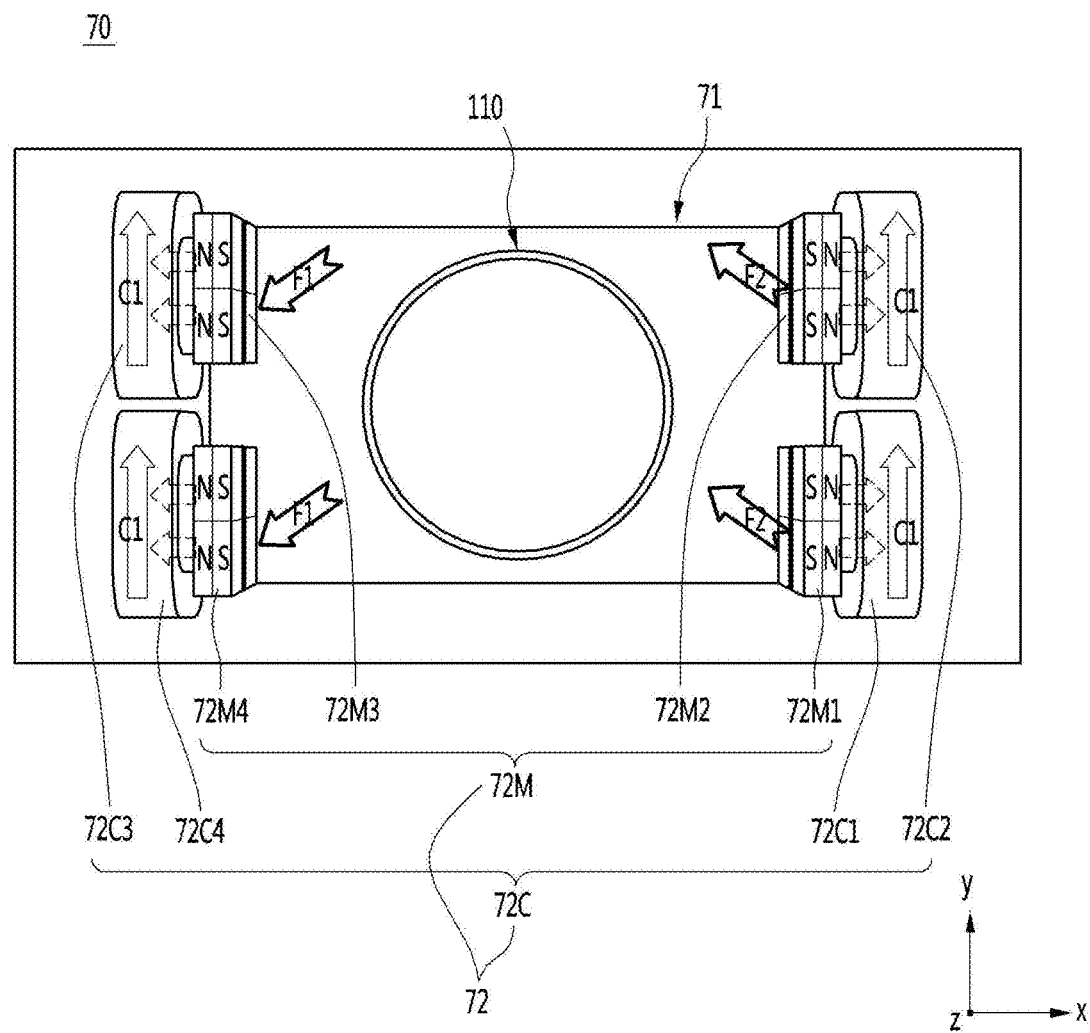
FIGS. 5 to 6B are views illustrating a first operation of the image stabilization device of the embodiment.
Figure 6A:
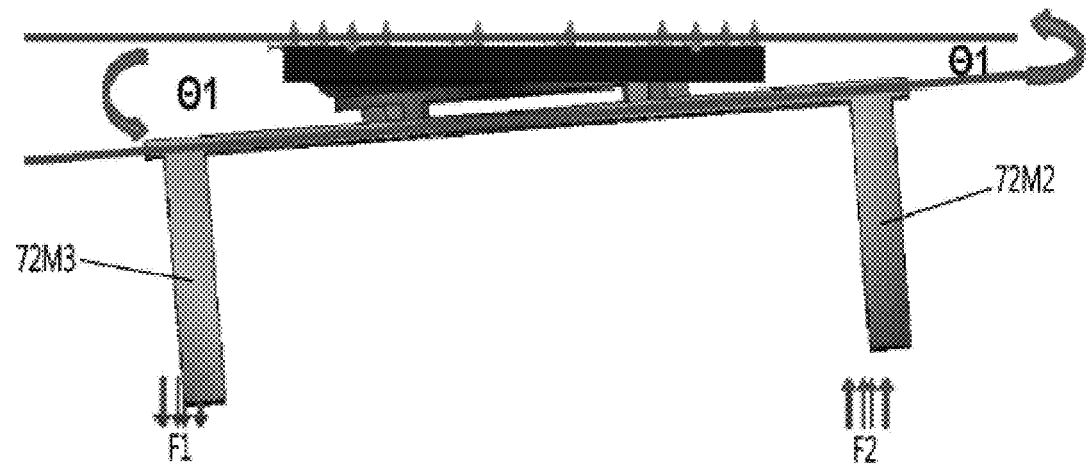
Figure 6B:
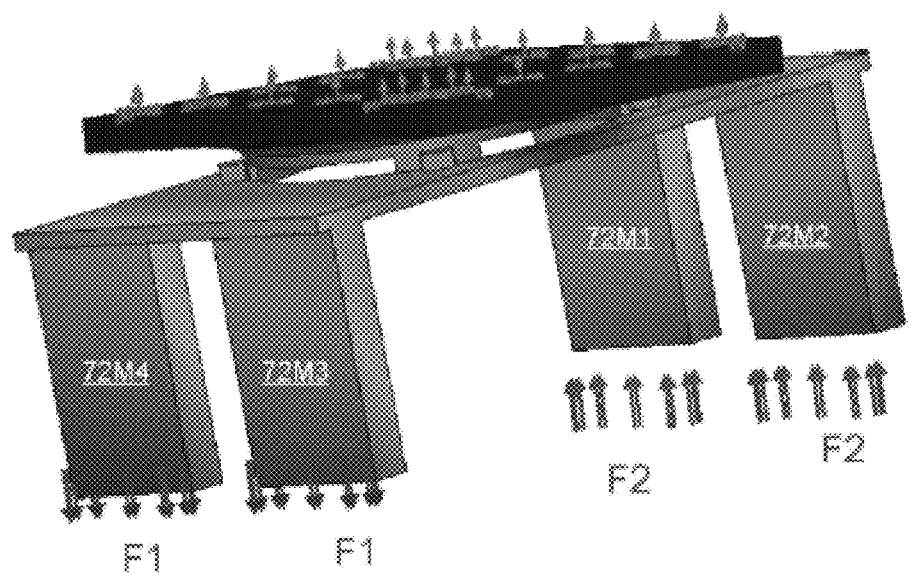

Next, FIGS. 5 to 6B are diagrams illustrating a first operation of the optical image stabilization device of the embodiment.

For example, FIG. 5 is a first operation illustrative view of the optical image stabilization device 70 viewed in the z-axis direction from the camera module 100 according to the embodiment illustrated in FIG. 1.

Also, FIG. 6A is a conceptual view of the y-axis direction of the first operation example of the optical image stabilization device of the embodiment shown in FIG. 5, and FIG. 6B is a conceptual perspective view of a first operation example of the optical image stabilization device of the embodiment shown in FIG. 5.

In an embodiment, the image stabilization control unit 72 shown in FIG. 3 may be disposed on the optical image stabilization device in a state rotated 180 degrees in the form shown in FIG. 3. That is, as shown in FIG. 4b, the magnet part 72M may be disposed to protrude in the direction of the second prism 71b.

Referring to FIG. 5, power is applied to the coil part 72C to flow current through each coil, and accordingly, an electromagnetic force is applied between the coil part 72C and the magnet part 72M in the first direction F1 or second direction F2. So, the second support 71b2 may be tilted at a predetermined angle by the moving magnet part 72M, and accordingly, the apex angle Θ of the second prism 71b may be controlled.

For example, referring to FIG. 5, the first magnet 72M1 and the second magnet 72M2 may be arranged such that a direction of magnetic force may occur in the direction of the first coil 72C1 and the second coil 72C2. And the third magnet 72M3 and the fourth magnet 72M4 may be arranged to generate a direction of magnetic force in the direction of the third coil 72C3 and the fourth coil 72C4.

At this time, when the current Cl in the first direction flows from the first coil 72C1 and the second coil 72C2, a force F2 may be applied in the second direction. Meanwhile, when the current Cl in the first direction flows from the third coil 72C3 and the fourth coil 72C4, a force F1 may be applied in the first direction opposite to the second direction.

Accordingly, as shown in FIGS. 6A and 6B, a force F2 is applied to the second support 71b2 of the second prism 71b in the second direction in the first magnet 72M1 and the second magnet 72M2. In the third magnet 72M3 and the fourth magnet 72M4, a force F1 may be applied in the first direction, and through this, the apex angle of the second support 71b2 is changed to the first angle Θ1 such that the path of light can be changed and controlled.

Figure 7:
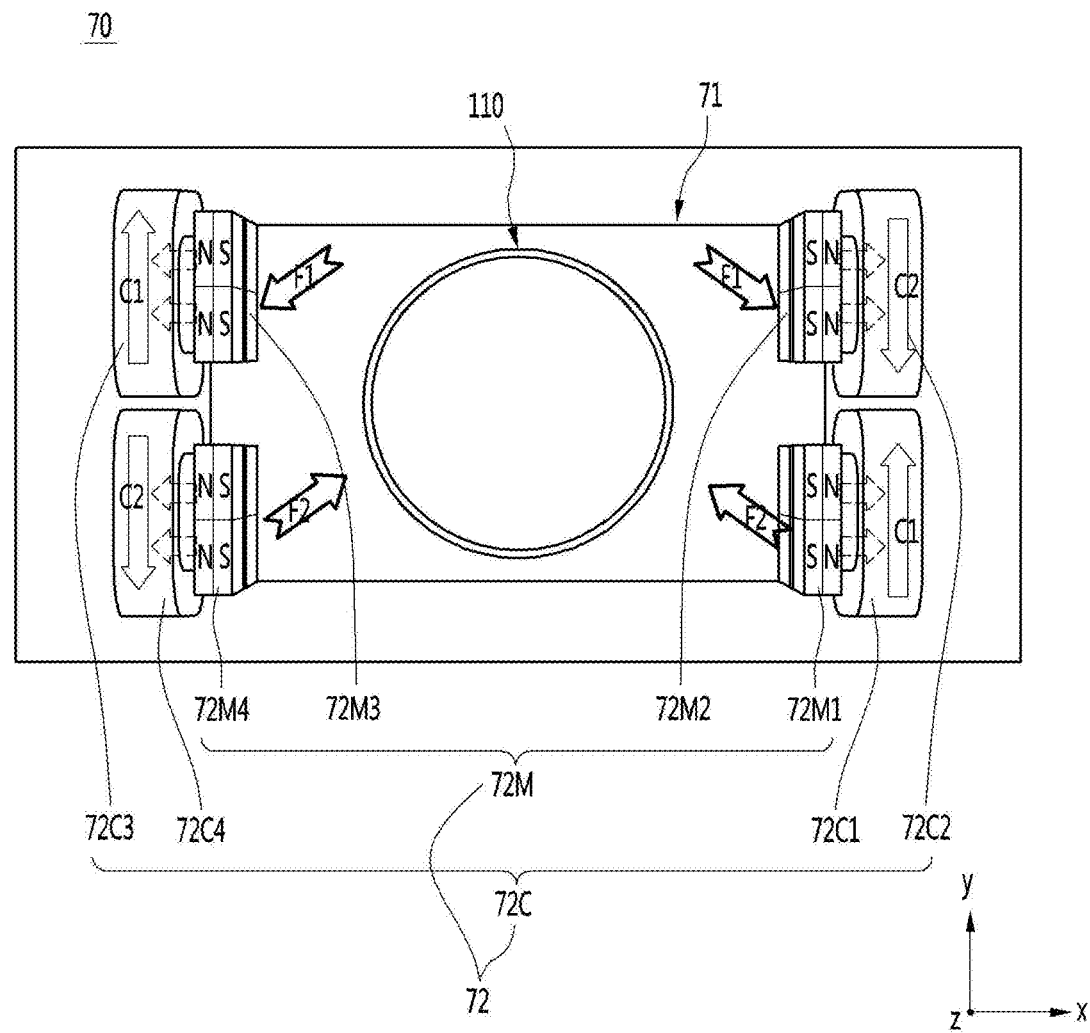
FIGS. 7 to 8B are views illustrating a first operation of the image stabilization device of the embodiment.
Figure 8A:
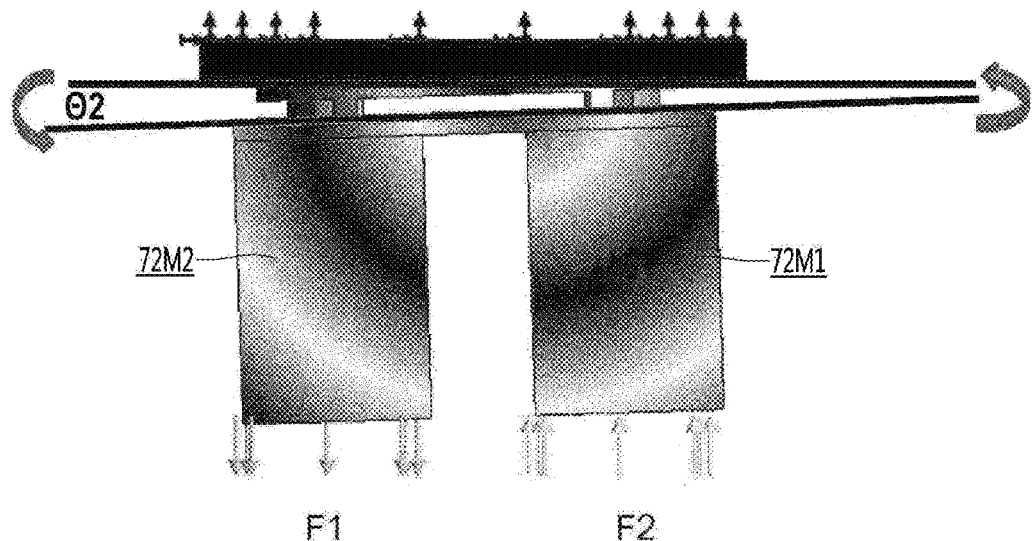
Figure 8B:
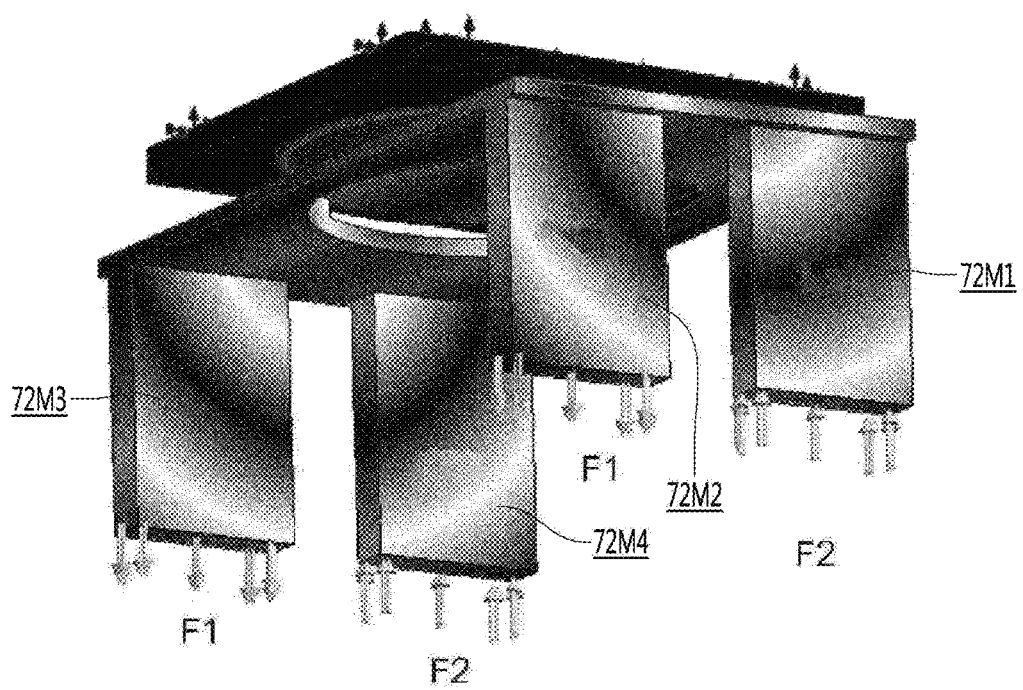

Next, FIGS. 7 to 8B are exemplary views of a second operation of the optical image stabilization device of the embodiment.

For example, FIG. 7 is a second operation illustrative view of the optical image stabilization device 70 viewed in the z-axis direction from the camera module 100 according to the embodiment illustrated in FIG. 1.

FIG. 8A is a conceptual view of an x-axis direction of a second operation example of the optical image stabilization apparatus of the embodiment shown in FIG. 7, and FIG. 8B is a conceptual perspective view of a second operation example of the optical image stabilization apparatus of the embodiment shown in FIG. 7.

For example, power is applied to the coil part 72C, and current flows through each coil. Accordingly, electromagnetic force between the coil part 72C and the magnet part 72M is applied in the first direction F1 or the second direction F2, and the second support 71b2 may be tilted at a predetermined angle.

For example, referring to FIG. 7, the first magnet 72M1 and the second magnet 72M2 may be arranged such that a direction of magnetic force may occur in the directions of the first coil 72C1 and the second coil 72C2. And the third magnet 72M3 and the fourth magnet 72M4 may be arranged to generate a direction of magnetic force in the direction of the third coil 72C3 and the fourth coil 72C4.

At this time, the current Cl in the first direction flows through the first coil 72C1 and the third coil 72C3, and the current C2 in the second direction flows through the second coil 72C2 and the fourth coil 72C4. Can flow.

Accordingly, the force F2 may be applied in the second direction from the first magnet 72M1 and the fourth magnet 72M4, and the force F1 from the second magnet 72M2 and the third magnet 72M3 may be applied in the first direction.

Accordingly, as shown in FIGS. 8A and 8B, a force F2 is applied to the second support 71b2 of the second prism 71b in the second direction in the first magnet 72M1 and the fourth magnet 72M4. In the second magnet 72M2 and the third magnet 72M3, a force F 1 may be applied in the first direction, and through this, the apex angle of the second support 71b2 is changed to the second angle Θ2 such that the path of light can be changed and controlled.

FIG. 8A may correspond to FIG. 4B while rotated 180 degrees.

Figure 9:
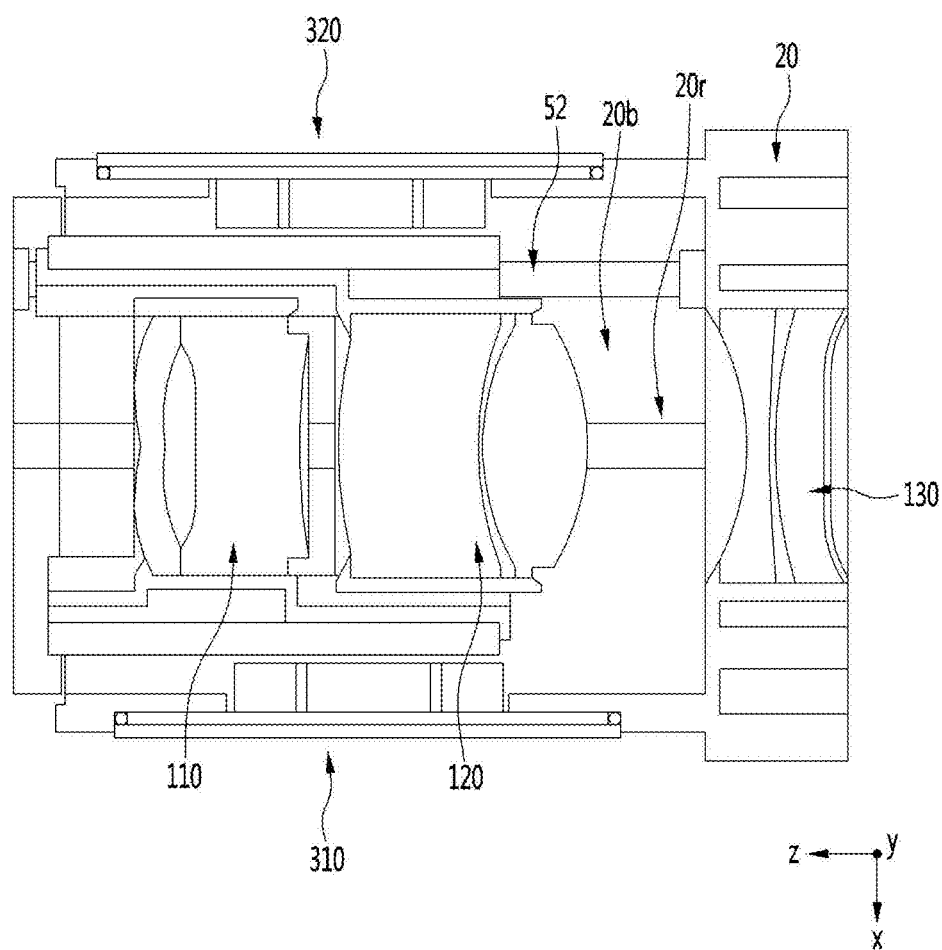
FIG. 9 is a partial cross-sectional view of a camera module according to an embodiment.

Next, FIG. 9 is a partial cross-sectional view of the camera module according to the illustrated embodiment. For example, FIG. 9 is a cross-sectional view of the camera module 100 according to the embodiment shown in FIG. 1 cut in the z-axis direction with respect to areas excluding the image stabilization device 70 and the image sensor unit 25. Meanwhile, in FIG. 9, the bottom surface 20b and the bottom groove 20r of the first base 20 are not cut surfaces, and other components may be cut surfaces.

Referring to FIG. 9, in the camera module according to the embodiment, various optical systems may be disposed on a predetermined first base 20.

The first base 20 may be formed of any one or more of plastic, glass-based epoxy, polycarbonate, metal, or composite materials.

In an embodiment, the first coil driving part 310 and the second coil driving part 320 may be disposed on both sides of the first base 20 along x-axis direction perpendicular to the optical axis direction on the ground. In addition, a predetermined first circuit board (not shown) is disposed under the first base 20 to be electrically connected to lens drivers inside the first base 20.

The optical module and the lens driver may be disposed on the first base 20 of the camera module 100 according to the embodiment. For example, the camera module 100 according to the embodiment includes at least one of a first lens assembly 110, a second lens assembly 120, a third lens group 130, and a first coil driver 31, the second coil driver 320 and the guide pin 52 disposed on the first base 20.

A magnet (not shown) may be disposed on the first lens assembly 110 and the second lens assembly 120, respectively.

According to an embodiment, a bottom groove 20r in which the first lens assembly 110 and the second lens assembly 120 move is formed on the bottom surface 20b of the first base 20 in the direction of the optical axis z. The bottom groove 20r may have a concave shape downward according to the outer circumferential shape of the lens, but is not limited thereto.

The guide pin 52 may perform a guide function of the lens assembly to be moved, and may be provided in a singular or plural. And the guide pin 52 may be referred to as a rod or a shaft.

According to an embodiment, as the first prism 71a is disposed inside the image stabilization control unit 72, the magnet part 72M, which is a magnet for OIS, may be disposed apart from the driving unit for AF.

For example, referring to FIGS. 1 and 9, when the first lens assembly 110 or the second lens assembly 120 is utilized for AF, the first lens assembly 110 or the second lens assembly 120 may be provided with a predetermined magnet.

At this time, according to the embodiment, the magnet part 72M of the image stabilization control unit 72, which is a magnet for OIS, is disposed separately from the first lens assembly 110 or the second lens assembly 120, and the first prism 71a is disposed inside the image stabilization control unit 72, so there is a special technical effect of providing an image stabilization device and a camera module including the same capable of inhibiting magnetic field interference between the OIS magnet and the AF magnet.

INDUSTRIAL APPLICABILITY

The embodiment may be applied to mobile terminals such as mobile phones, laptops, drones, vehicles, and the like.

For example, a camera module according to an embodiment may be built in a portable device such as a smartphone, a tablet PC, or a laptop.

The camera module according to the embodiment may perform an autofocus (AF) function to automatically adjust the distance between the image sensor and the lens to align the focal length of the lens.

According to an embodiment, there is a technical effect of providing an image stabilization device and a camera module including the same, capable of inhibiting magnetic field interference between an OIS magnet and an AF magnet.

The technical effects of the embodiments are not limited to those described in this section, and include those that can be understood from the entire description of the invention.

Features, structures, effects, etc. described in the above embodiments are included in at least one embodiment, but are not necessarily limited to one embodiment. Furthermore, the features, structures, effects, and the like illustrated in the embodiments may be combined or modified with respect to other embodiments by those skilled in the art to which the embodiments belong. Therefore, it should be interpreted that the contents related to such combinations and modifications are included in the scope of the embodiments.

Although the embodiments have been described above, the embodiments are only examples, and are not intended to limit the embodiments. Those skilled in the art to which the embodiments pertain may have several examples that are not exemplified above without departing from the essential characteristics of the present embodiments. It will be understood that modifications and applications of the branches are possible. For example, each component specifically shown in the embodiment can be modified. And differences relating to these modifications and applications will have to be construed as being included in the scope of the embodiments set forth in the appended claims.

The invention claimed is:

1. An image stabilization device, comprising:
a first prism changing a path of a light beam;
a second prism disposed under the first prism and changing a path of the light beam emitted from the first prism; and
an image shake control unit including a coil part and a magnet part for controlling a shape of the second prism;
wherein the first prism is disposed inside the image shake control unit,
wherein the second prism is a variable wedge prism,
wherein the image shake control unit is configured to control the path of the light beam by changing the shape of the second prism through the magnet part,
wherein the first prism is configured to horizontally overlap the magnet part, and
wherein the second prism is configured to vertically overlap the magnet part.

2. The image stabilization device according to claim 1, wherein the image stabilization device is configured to control the path of the light beam by changing an apex angle of the second prism through the magnet part.

3. The image stabilization device according to claim 1, wherein the second prism includes a first support, a second support, and a side support,
and comprises an optical liquid disposed in a space formed by the first support, the second support, and the side support.

4. The image stabilization device according to claim 3, wherein the second prism includes the first support disposed on a lower portion and the second support disposed on an upper portion, and the side support disposed on sides of the first support and the second support.

5. The image stabilization device according to claim 4, wherein the first support and the second support have each has a hollow circular ring shape or a rectangular ring shape.

6. The image stabilization device according to claim 3, wherein the first and second supports are formed of a light-transmitting material.

7. The image stabilization device according to claim 3, wherein the side support is formed of a stretchable material.

8. The image stabilization device according to claim 3, wherein relative positions of ends of the second support are adjustable when in contact with the magnet part.

9. The image stabilization device according to claim 3, wherein relative positions of ends of the second support are adjustable when spaced apart from the magnet.

10. The image stabilization device according to claim 3, wherein a portion of the second support is configured to move upward or downward when the second support receives a predetermined force by the magnet part.

11. The image stabilization device according to claim 3, wherein the second support is configured to move when in contact with the magnet part.

12. The image stabilization device according to claim 3, wherein the second support is configured to move when spaced apart from the magnet part.

13. The image stabilization device according to claim 3, wherein the magnet part comprises a first magnet and a second magnet arranged such that a direction of a first magnetic force occurs in a direction of a first coil and a second coil, and
wherein the magnet part comprises a third magnet and a fourth magnet arranged to generate a direction of a second magnetic force in a direction of a third coil and a fourth coil.

14. The image stabilization device according to claim 13, wherein an upper left side of the second support receives the magnetic force in a first direction from the first magnet and an upper right side of the second support is adjustable by receiving the magnetic force in a second direction from the second magnet, and the second support is configured to tilt at a slope of a predetermined angle $\Theta$.

15. A camera module, comprising:
a first base;
a lens assembly disposed on the first base;
an image sensor unit disposed on one side of the lens assembly; and
the image stabilization device of claim 1 disposed on a second side of the lens assembly.

* * * * *